United States Patent
Stafford et al.

(10) Patent No.: US 6,664,916 B1
(45) Date of Patent: Dec. 16, 2003

(54) SYSTEM AND METHOD FOR IDENTIFYING NAVIGATIONAL MARKERS USING RADAR

(76) Inventors: Todd R. Stafford, 721 Jack St., Anchorage, AK (US) 99515; Dennis C. Higgins, 3321 SW. 20$^{th}$ St., Fort Lauderdale, FL (US) 33312

(*) Notice: Subject to any disclaimer, the term of this patent is extended or adjusted under 35 U.S.C. 154(b) by 0 days.

(21) Appl. No.: 10/215,426

(22) Filed: Aug. 9, 2002

(51) Int. Cl.$^7$ .................. G01S 13/74; G01S 13/88; G01S 13/93; G01S 13/00
(52) U.S. Cl. ................. 342/46; 342/5; 342/6; 342/27; 342/41; 342/42; 342/51; 342/159; 342/175; 342/195
(58) Field of Search ............... 342/5–12, 41–51, 342/175, 195, 27, 28, 159

(56) References Cited

U.S. PATENT DOCUMENTS

| | | | | |
|---|---|---|---|---|
| 3,247,508 A | * | 4/1966 | Bradford et al. | 342/44 |
| 3,689,842 A | * | 9/1972 | Meed | 342/51 |
| 3,691,557 A | * | 9/1972 | Constant et al. | 342/44 |
| 3,697,987 A | * | 10/1972 | Arthur | 342/41 |
| 3,717,873 A | * | 2/1973 | Riggs | 342/41 |
| 3,721,950 A | * | 3/1973 | Jorgensen et al. | 342/51 |
| 3,725,918 A | * | 4/1973 | Fleischer et al. | 342/41 |
| 3,737,904 A | * | 6/1973 | Mori et al. | 342/5 |
| 3,772,692 A | * | 11/1973 | Braddon | 342/41 |
| 3,772,693 A | * | 11/1973 | Allard et al. | 342/42 |
| 3,787,845 A | * | 1/1974 | Kubota et al. | 342/41 |
| 3,806,927 A | * | 4/1974 | Lane, Jr. | 342/7 |
| 3,886,548 A | * | 5/1975 | Majeau et al. | 342/44 |
| 3,971,018 A | * | 7/1976 | Isbister et al. | 342/41 |
| 3,972,043 A | * | 7/1976 | Locus | 342/11 |
| 3,981,011 A | * | 9/1976 | Bell, III | 342/44 |
| 4,031,535 A | * | 6/1977 | Isbister | 342/46 |
| 4,148,033 A | * | 4/1979 | Speckter | 342/7 |
| 4,763,361 A | * | 8/1988 | Honeycutt et al. | 342/45 |

* cited by examiner

*Primary Examiner*—Bernarr E. Gregory
(74) *Attorney, Agent, or Firm*—Leffert Jay & Polglaze, P.A.

(57) ABSTRACT

A system containing a navigational marker, the navigational marker having the ability to reflect radar in such a manner that the navigational marker is identified. In one embodiment, a polarized radar-reflective material is affixed to the navigational marker. A radar signal is reflected by the polarized radar-reflective material, causing the reflected radar signal to be polarized. The reflected radar signal is received and the navigational marker is identified. The radar system contains a detector/decoder capable of distinguishing the type of navigational marker based on the reflected radar signal. The detector/decoder relays information about the navigational marker to a display. In another embodiment, a navigational marker contains a radio responder. When a radar signal illuminates the navigational marker, the radio responder transmits a signal containing encoded data. A receiver detects the signal from the responder and decodes the encoded data. The decoded data is relayed to a display.

28 Claims, 5 Drawing Sheets

SYSTEM AND METHOD FOR IDENTIFYING NAVIGATIONAL MARKERS USING RADAR

TECHNICAL FIELD

The present invention relates generally to the field of navigation and, in particular, to identification of navigational markers.

BACKGROUND

Radar is commonly employed in many navigational systems, particularly in the areas of aeronautical and marine transportation. In marine transportation, radar is used for navigation and collision avoidance. Radar is a necessary component of marine navigation, as it allows the operator of a vessel to follow a safe course along a body of water, and to adjust the course of the vessel in avoidance of objects and obstructions. In marine navigation, radar is used in telemetry, to sense and determine range (distance) from, and/or bearing (direction) of, natural and man-made objects, the positions of which are known. These objects include natural geodetic features, such as shorelines, rocks, islands, and man-made objects such as bridges, jetties, breakwaters, harbors, and others. Radar is also essential in collision avoidance by locating and identifying unknown objects, such as other vessels, ice masses, debris, logs, and others. Warning markers and buoys, placed to divert marine traffic from hazards, such as rocks, sandbars, submerged wrecks, and the like, are also detected by radar. Buoys and markers are commonly placed to ensure safe and efficient navigation by guiding marine traffic along designated paths in bodies of water, such as the main channel of a river.

In most marine navigation systems, radar is pulse modulated, which creates a pulse emission sequence. A radar transmitter, which is coupled to an antenna, generates a very short pulse of radio-frequency (RF) energy. The duration of the pulse is typically on the order of 1 milli-second. The RF energy radiates outward from the antenna, wherein the radiated RF energy is focused into a relatively narrow directional beam. When the RF energy strikes an object, a portion of the RF energy is reflected (echoed) by the object and the antenna receives the reflected RF energy. A radar display screen synthesizes the RF energy reflections into visual representations of the object reflecting the RF energy. The display screen shows the approximate range and bearing of the object in relation to the radar antenna. The radar transmitter generates another pulse, and the sequence is repeated.

There are several factors that affect the ability of radar systems to effectively sense objects. The radiated RF energy may be diffracted by other objects in the area, creating abnormalities in the display image. The radiated RF energy may also be subject to unwanted reflections by unforeseen objects in its path, such as waves and turbulence on the surface of the water, creating "false" images. The amount of unwanted reflections typically increases at higher radio frequencies. Another condition that affects radar is atmospheric attenuation or absorption of the radiated RF energy, which reduces the echo intensity. A further limitation of radar is that the radiated RF energy tends to travel primarily in a straight line, thus limiting the effective range of radar to approximately the line of sight from the antenna outward to the horizon. The effective range of radar thus becomes a function of the height of the antenna above the surface of the water. It should be noted that the radiated RF energy has some ability to refract, or bend, in the atmosphere, thus increasing the effective range of the radar beyond the line of sight. However, the atmospheric refractivity of radar greatly diminishes at higher radio frequencies.

The resolution of radar is a function of frequency. Radars operating at higher radio frequencies have shorter wavelengths and are capable of detecting smaller objects, however, higher frequency radars have shorter ranges and are more susceptible to unwanted reflections.

Buoys are floating aids to navigation. Buoys mark channels and harbors, indicate shoals and obstructions, and provide warnings of dangers such as rocks or shallow water. Buoys are typically moored via cables or chains to the bottom of a body of water. One type of buoy contains a lamp to increase visibility. The light emitted by the lamp may be a certain color, depending on its intended use. For example, green and red lamps are used respectively to mark the left (port) and right (starboard) sides of a channel as viewed in the upstream direction. Other colors are used to mark danger buoys. Another type of buoy employs an audible device, such as a bell, gong, or whistle, to alert operators of vessels. Yet another type of buoy uses a radio responder, called a racon. The racon emits a radio signal when triggered by radar from a vessel. A radar receiver on the vessel detects the radio signal emitted from the racon. The radio signal emitted from the racon is displayed on the radar display screen. However, the information provided from the racon to the radar system only provides an approximate range and/or bearing of the buoy. The information does not identify the type of buoy or the purpose of the buoy.

A very common type of buoy is a simple floating marker, unlighted, and without an audible device or racon. The standard unlighted buoy is detected either visually, or by reflecting radar. The standard unlighted buoy bears markings to denote its specific purpose. For example, a buoy bearing a green marking may be used to direct traffic to the right of the buoy, thus the buoy is seen on the left, or "port" side of the passing vessel. Certain unlighted buoys are differentiated by shape. Shapes of buoys include conical, cylindrical, spherical, and others.

Some buoys are equipped with a radar-reflective device to enhance their detection by radar systems. The radar-reflective device is typically an object constructed of light-gauge sheet metal, formed in such a manner as to reflect a portion of the radar signal that strikes it. Radar-reflective devices are typically affixed to the outside of a buoy, and are often subject to corrosion and damage. Nevertheless, buoys of this type, lacking a racon device, tend to be poor reflectors of radar. When radar detects a buoy or marker, the reflected image is sometimes displayed as an unidentifiable shape on the radar screen. The radar system cannot distinguish the color or markings of the buoy, requiring the vessel operator to visually identify the buoy. In conditions of poor visibility, visual identification of the buoy may occur too late for safe navigation. Due to the limited resolution of the radar, the image on the radar screen may be indistinguishable from the image of another object, such as a vessel or floating log. Speculation as to the identity of the reflected image creates an undue hazard in navigation, as the vessel operator is unsure as to which course to take in relation to the unidentified object.

For the reasons stated above, and for other reasons stated below which will become apparent to those skilled in the art upon reading and understanding the present specification, there is a need in the art for improvements in identifying navigational markers in transportation systems.

SUMMARY

The above-mentioned problems with identifying markers in radar navigation and other problems are addressed by embodiments of the present invention and will be understood by reading and studying the following specification.

In one embodiment, a navigational marker includes a body and a polarized radar-reflective material affixed to the body. The polarized radar-reflective material identifies the navigational marker.

In another embodiment, a radar receiving apparatus includes a receiving antenna, a circuit connected to the receiving antenna for detecting a radar signal and identifying a distinctly polarized radar reflection from a navigational marker, the circuit generating information identifying the navigational marker, and a display connected to the circuit to output the generated information.

In yet another embodiment, a method includes transmitting a signal to a navigational marker, polarizing a reflected signal from the navigational marker, receiving the polarized reflected signal at a radar receiver, and identifying the navigational marker by decoding the polarized reflected signal.

Other embodiments are described and claimed.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense, and the scope of the present invention is defined only by the claims and equivalents thereof.

Figure 1:
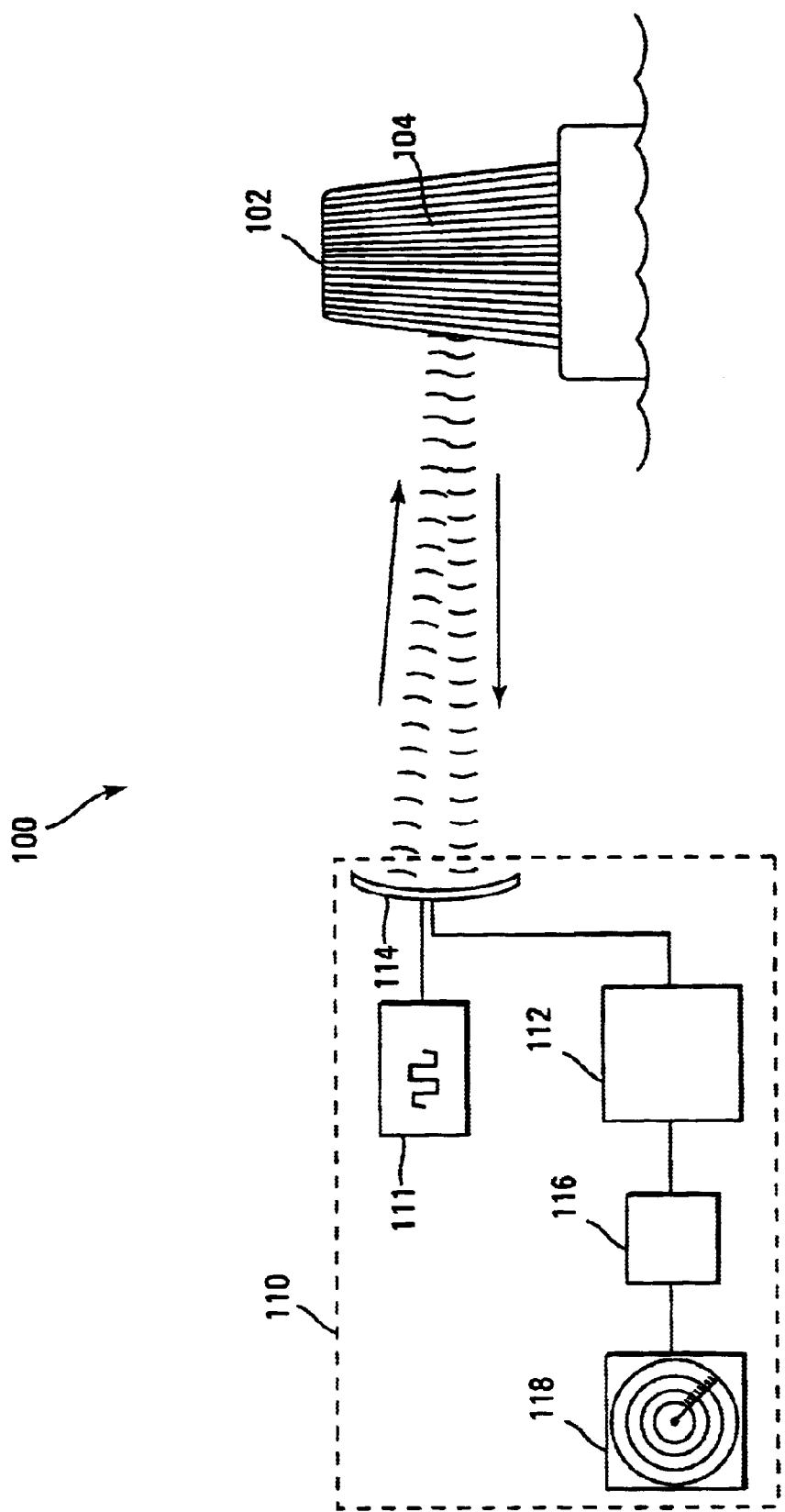
FIG. 1 is a block diagram of a system for identifying navigational markers according to one embodiment of the present invention.

FIG. 1 is a block diagram of one embodiment of a system 100 for identifying navigational markers. The system 100 includes a radar system 110, and a navigational marker 102. The radar system 110 includes a transmitter 111, coupled to an antenna 114. The radar system 110 has a receiver 112, which is also coupled to the antenna 114. The radar system has a display 118, which graphically synthesizes references of objects sensed by the radar system. The transmitter 111 generates a radio-frequency signal. The radio-frequency signal is relayed to the antenna 114, where the radio-frequency signal is focused in a particular direction and transmitted as a radar signal. The radar signal illuminates the navigational marker 102, causing a portion of electromagnetic energy from the radar signal to be reflected back.

In one embodiment, the navigational marker 102 has a reflective material 104. The reflective material 104 is affixed to the surface of the body of the navigational marker 102. In another embodiment, the reflective material is located inside the body of the navigational marker 102. The reflective material 104 increases the portion of the radar signal that is reflected back from the navigational marker 102. The reflective material 104 also provides identification of the type of navigational marker 102. In one embodiment, the reflective material 104 is a polarized coating that is adhered to the body of the navigational marker 102. The reflective material 104 contains one or more of multiple polarization configurations. Each of the one or more multiple polarization configurations of reflective material 104 denotes distinct identifying characteristics of navigational marker 102. The reflected radar signal is polarized in a distinct manner by the reflective material 104.

In another embodiment, the reflective material 104 contains metal particles. In yet another embodiment, the reflective material 104 is etched into the body of the navigational marker 102. The antenna 114 receives the reflected radar signal, where the reflected radar signal is converted to an electrical signal. The electrical signal is relayed to the receiver 112, where the electrical signal is demodulated. In one embodiment, the radar system 110 also includes a detector/decoder 116. The detector/decoder 116 receives the demodulated signal from the receiver 112. The detector/decoder 116 detects the polarization of the demodulated signal and determines the distinct identifying characteristics, range and heading of the navigational marker 102. The distinct identifying characteristics, range and heading of the navigational marker 102 are output to display 118.

While navigational markers have been described with the embodiments, it should be understood that other objects are amenable to identification with the present embodiments. Such other objects include by way of example only and not by way of limitation docks, marinas, inlets, rivers, intersecting waterways, landmarks, shoals, buildings, or other objects that can be marked with a marker or buoy and are usable to aid in identification of a vessel's position. Further, while radar has been described as used on a vessel such as a ship, the radar of the present embodiments is amenable to use with land based as well as aircraft based radar systems.

Figure 2:
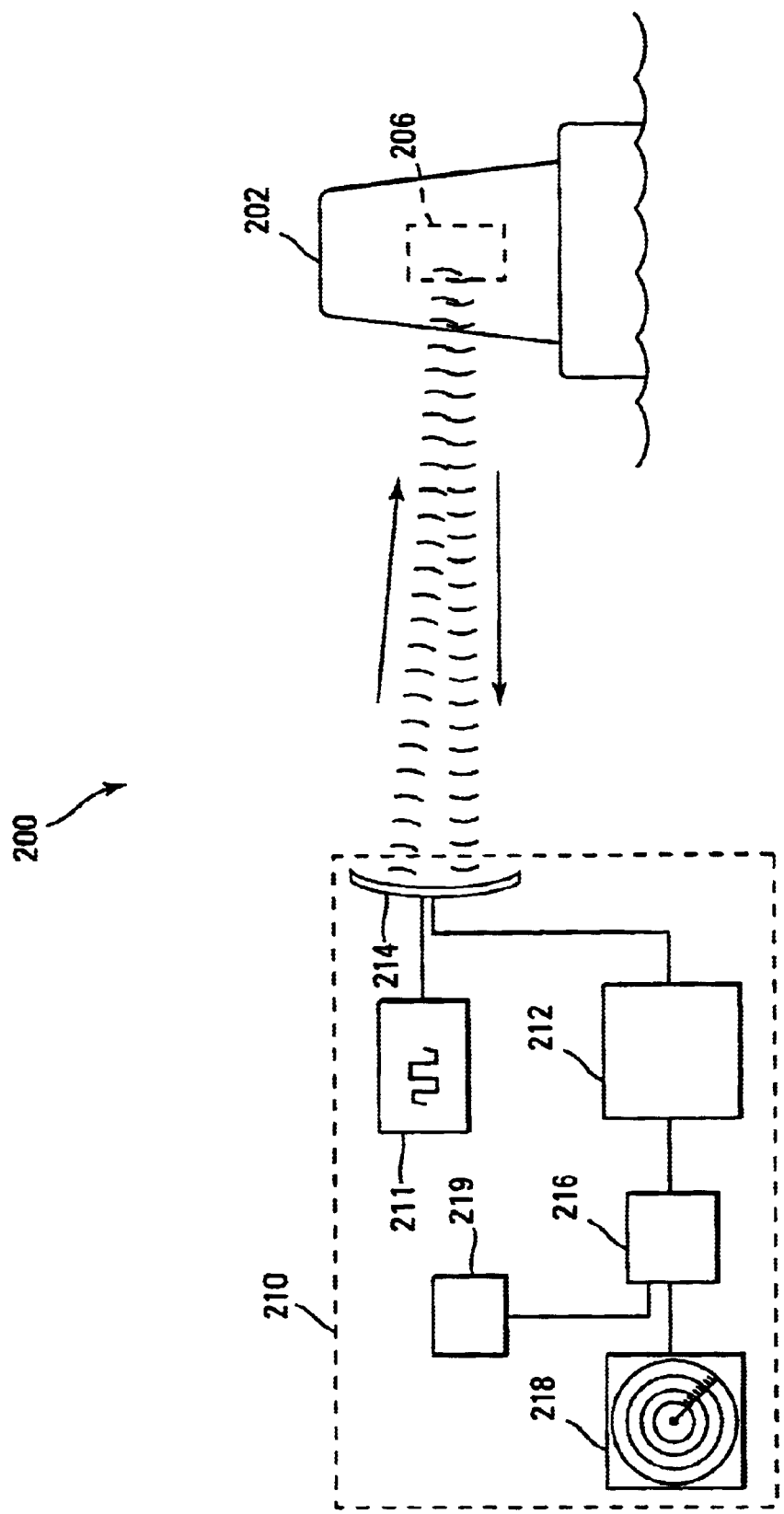
FIG. 2 is a block diagram of a system for identifying navigational markers according to another embodiment of the present invention.

FIG. 2 is a block diagram of another embodiment of a system 200 for identifying navigational markers. The system 200 includes a radar system 210, and a navigational marker 202. The navigational marker 202 includes a radio transponder 206 capable of detecting a radar signal and is adapted to transmit information via a radio signal. The radar system 210 includes a transmitter 211, coupled to an antenna 214. The radar system 210 has a receiver 212, which is also coupled to the antenna 214. The radar system includes a display 218, which graphically synthesizes references of objects sensed by the radar system 210. The transmitter 211 generates a radio-frequency signal. The radio-frequency signal is relayed to the antenna 214, where the radio-frequency signal is focused in a desired direction and transmitted as a radar signal. The radar signal illuminates the navigational marker 202. The radio transponder 206 detects the radar signal. Upon detection of the radar signal, the radio transponder 206 is triggered and the radar transponder 206 broadcasts encoded information in a radio-frequency signal.

The antenna 214 receives the encoded information in the radio-frequency signal. In one embodiment, the encoded information in the radio-frequency signal is broadcast by the radio transponder 206 in the form of digitally encoded data. The encoded information in the radio-frequency signal broadcast by the radio transponder 206 includes one or more of range, bearing, global positioning coordinates, cautionary information, atmospheric data, depth information, traffic information, special instructions, and others. In one embodiment, a detector/decoder 216 is adapted to detect and decode the encoded information in the radio-frequency signal from the radio transponder 206 and to relay the decoded information to the display 218. In another embodiment, the decoded information relayed from the detector/decoder 216 is relayed to an auxiliary output device 219, such as a recorder, processor, printer, or an alternate display screen. The radio transponder 206 therefore provides specific navigational data to vessel operators.

Figure 3:
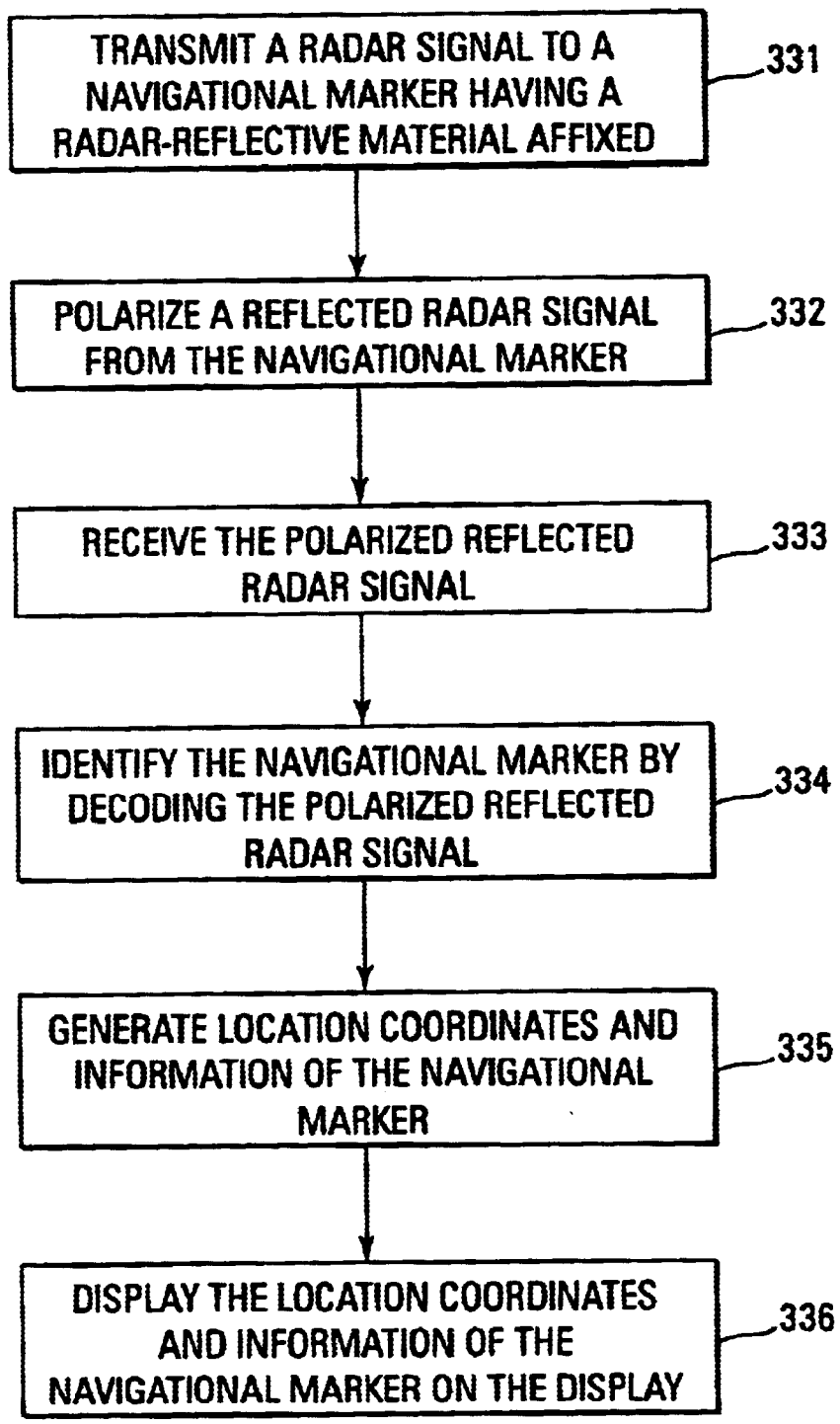
FIG. 3 is a flow chart diagram of a process for identifying navigational markers using radar according to another embodiment of the present invention.

FIG. 3 is a flow chart that illustrates an embodiment of a process 300 for identifying navigational markers using radar. In operation, the method begins at block 331, where a radar signal generated by transmitter 111 is transmitted from antenna 114 and directed toward navigational marker 102 having a reflective material 104. The radar signal illuminates the navigational marker 102 having the reflective layer 104. In block 332, the radar signal is polarized and reflected by the navigational marker 102 with the reflective material 104, and antenna 114 of radar system 110 receives the polarized reflected radar signal in block 334. The polarized reflected radar signal is converted to an electrical signal that is relayed to receiver 112. The receiver 112 demodulates the electrical signal, and the demodulated signal is relayed to detector/decoder 116. In block 334, the detector/decoder 116 detects the polarization of the demodulated signal and decodes the demodulated signal to identify the navigational marker 102. In block 335, the detector/decoder 116 generates location coordinates and information of the navigational marker 102. The location coordinates of the navigational marker 102 are output in block 336. In one embodiment, the location coordinates of the navigational marker 102 are output to a display 118.

Figure 4:
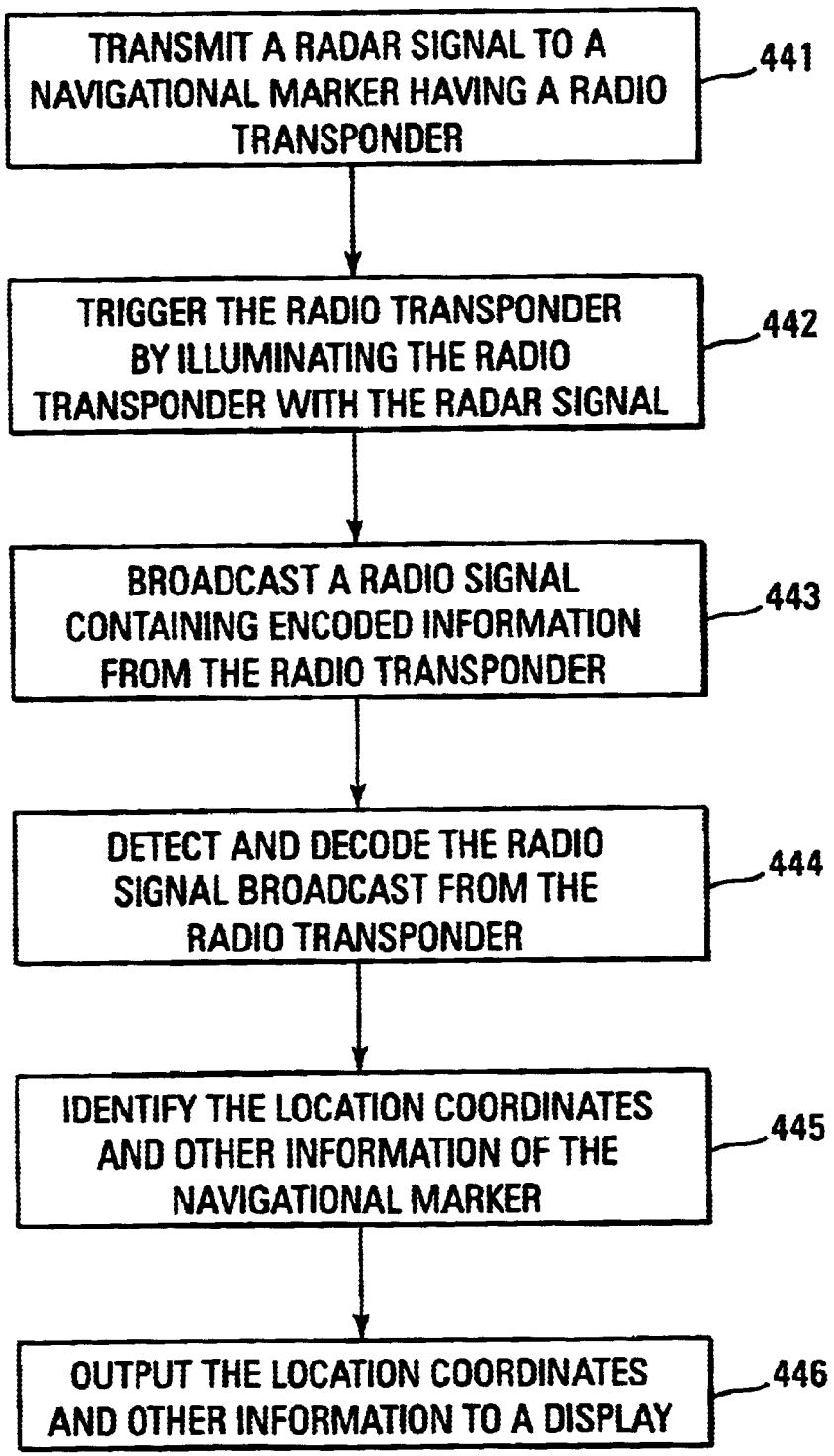
FIG. 4 is a flow chart diagram of a process for identifying navigational markers using radar according to another embodiment of the present invention.

FIG. 4 is a flow chart that illustrates another embodiment of a process for identifying navigational markers. In operation, the method begins at block 441, where a signal generated by transmitter 211 is transmitted from antenna 214 and directed toward navigational marker 202 having a radio transponder 206. The signal illuminates the navigational marker 202, wherein the radio transponder 206 detects the signal. In block 442, the radio transponder 206 is triggered by the radar signal, and in block 443, the radio transponder 206 broadcasts encoded information in a radio-frequency signal. The encoded information in the radio signal is received by antenna 214 and is relayed to receiver 212. The receiver 212 demodulates the radio signal and the encoded information is relayed to detector/decoder 216. The detector/decoder 216 detects the encoded information relayed by the receiver 212 and decodes the information in block 444, and the decoded information is processed by the detector/decoder 216 in block 445.

The processed information is utilized by the detector/decoder 216 to identify the location coordinates and other information of the navigational marker 202. In block 446, the processed information is relayed to a display 218. The display 218 shows the location coordinates for the navigational marker 202. In one embodiment, the display 218 also shows other information from the navigational marker 202, such as one or more of global positioning coordinates, cautionary information, atmospheric data, depth information, traffic information, special instructions, and others, or computed information such as range, bearing, and the like. In another embodiment, the information is relayed to an auxiliary output device 219, such as a recorder, processor, printer or an alternate display screen. In one embodiment, the signals transmitted and received are radar signals.

One example of a system for target identification identifies in one embodiment channel markers in a channel or body of water as red or green, and displays the identification on a display. While channel markers are used in the example, it should be understood that many other objects are amenable to marking in the manner described, including by way of example only and not by way of limitation, bridges, shoals, fuel stations, danger buoys, submerged objects such as reefs, sand bars, sunken vessels, and the like.

In one embodiment, the target or marker has a mechanical structure bolted or otherwise attached to the marker that gives the marker a unique signature to the radar receiver. This signature is in one embodiment detected and recognized by software. Various markers of different color each have their own individual signature, and are therefore distinguishable. Once the marker identification has been determined, an appropriate display for the marker is placed on the viewer screen for the user.

In one embodiment, the reflector is a passive reflector not requiring any power. The mechanical structure is viewable or readable omni-directionally (360 degrees)

Figure 5:
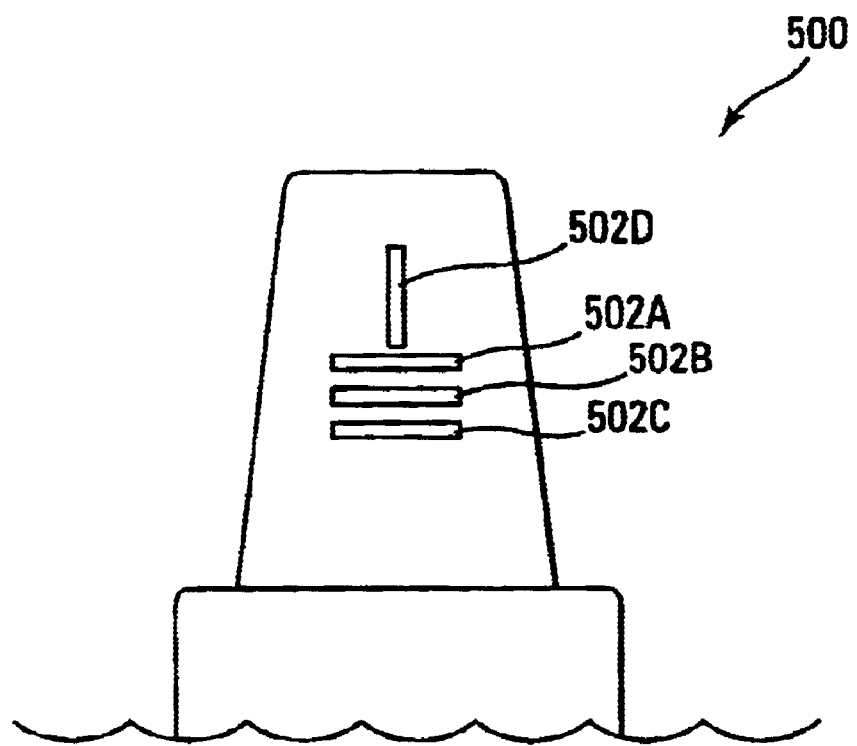
FIG. 5 is a diagram of a marker according to another embodiment of the present invention.

In another embodiment, the mechanical structure is constructed out of radar reflective material, assembled with flutes at various angles to give the reflected beam unique properties sent back to the display. An example of a mechanical structure 500 is shown in greater detail in FIG. 5. Structure 500 has a plurality of flutes 502 arranged in a pattern suitable to identify a marker as a specific color. In this example, four flutes 502 are used, with flutes 502A, 502B, and 502C arranged in parallel to each other, and with flute 502D arranged perpendicular to flutes 502A, 502B, and 502C. When a reflected signal is received, for example at a receiver such as receiver 114 or 212 as described above, the pattern of flutes with polarized material is detected, and interpreted as a marker of a color identified with the distinct pattern. It should be understood that any pattern that is distinguishable by the receiver is amenable to use with the embodiments of the present invention, and that such other patterns are within the scope of the present invention.

In yet another embodiment, the target has a polarized paint applied (i.e.: metal impregnated into the paint and applied to the marker with a magnetic influence as it is being applied) causing the metallic particles in the paint to align to a specific polarity on the marker, thus giving the reflected signal a unique signature to the radar receiver.

In one embodiment, the reflector is passive. In another embodiment, the reflector is passive, but is powered so that when it is excited by a radar transmission, the unit powers up and broadcasts a unique signature when a radar transmission excites it. The reflective structure is tuned to the radar frequencies in order to broadcast only when radar transmission energies hit it, so as to conserve power. Power supplies include by way of example only and not by way of limitation battery, solar, hydrogen fuel cell, and the like.

In another embodiment, a powered unit attached to the marker constantly broadcasts a code that uniquely identifies the target.

CONCLUSION

Systems and methods for identifying navigational markers using radar are disclosed herein. One embodiment includes a system containing a navigational marker. The navigational marker has an ability to reflect radar in such a manner so as to identify the navigational marker. In another embodiment, a polarized radar-reflective material is affixed to the navigational marker. A radar signal is reflected by the polarized radar-reflective material, causing the reflected radar signal to be polarized. The reflected radar signal is received and the navigational marker is identified. The radar system contains a detector/decoder capable of distinguishing the type of navigational marker based on the reflected radar signal. The detector/decoder relays information about the navigational marker to a display. In another embodiment, a navigational marker contains a radio responder. When a radar signal illuminates the navigational marker, the radio responder transmits a signal containing encoded data. A receiver detects the signal from the responder and decodes the encoded data. The decoded data is relayed to a display.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. A navigational marker, comprising:
    a navigational marker body; and
    a polarized radar-reflective material affixed to the body;
    wherein the polarized radar-reflective material identifies the navigational marker.
2. The navigational marker of claim 1. wherein the polarized radar-reflective material is adhered to the body.
3. The navigational marker of claim 1, wherein the polarized radar-reflective material is etched on the body.
4. The navigational marker of claim 1 wherein the polarized radar-reflective material is affixed to the body using fasteners.
5. The navigational marker of claim 1, wherein the polarized radar-reflective material is located within the body.
6. The navigational marker of claim 1, wherein the radar-reflective material includes metal particles.
7. The navigational marker of claim 1, wherein the radar-reflective material includes a metal film.
8. The navigational marker of claim 1, wherein the radar-reflective material is arrayed in a uniquely identifiable pattern.
9. A radar receiving apparatus, comprising:
    a receiving antenna;
    a circuit operatively connected to the receiving antenna, the circuit for detecting a radar signal and identifying a distinctly polarized radar reflection from a navigational marker, the circuit generating information identifying the navigational marker; and
    a display connected to the circuit to output the generated information.
10. The radar receiving apparatus of claim 9, wherein the information of the navigational marker identifies type of the navigational marker.
11. The radar receiving apparatus of claim 9, wherein the information of the navigational marker identifies location of the navigational marker.
12. The radar receiving apparatus of claim 9, wherein the information of the navigational marker includes warning information.
13. A method, comprising:
    transmitting a signal to a navigational marker;
    polarizing a reflected signal from the navigational marker;
    receiving the polarized reflected signal at a radar receiver; and
    identifying the navigational marker by decoding the polarized reflected signal.
14. The method of claim 13, further comprising generating location coordinates and information of the navigational marker; and
    displaying the location coordinates and information of the navigational marker on a display.
15. The method of claim 13, wherein polarizing is accomplished via reflecting the signal off a polarized coating to the navigational marker.
16. The method of claim 13, wherein polarizing is accomplished via reflecting the signal off a polarized metal object to the navigational marker.
17. The method of claim 13, wherein the location coordinates of the navigational marker are relayed to a processor.
18. The method of claim 13, wherein the location coordinates of the navigational marker are relayed to a computer display.
19. A navigational marker, comprising:
    a navigational marker body;
    a radio-frequency receiver positioned in the body, wherein the radio-frequency receiver detects a radar signal; and
    a radio-frequency transmitter, wherein the radio-frequency transmitter is adapted to transmit encoded data distinctly identifying the navigational marker.
20. The navigational marker of claim 19, wherein the transmitted encoded data includes information to identify the location of the navigational marker.
21. The navigational marker of claim 19, wherein the transmitted encoded data includes information to identify the type of the navigational marker.
22. The navigational marker of claim 19, wherein the transmitted encoded data includes warning information.
23. A method, comprising:
    transmitting a radar signal to a navigational marker having a radio transponder;
    triggering the radio transponder by illuminating the radio transponder with the radar signal;
    broadcasting a radio signal from the radio transponder;
    detecting the radio signal transmitted by the radio transponder;
    identifying the navigational marker having a radio transponder;
    generating location coordinates for the navigational marker having the radio transponder; and
    synthesizing on a display the location coordinates of the navigational marker having the radio transponder.
24. The method of claim 23, wherein the radio signal transmitted by the radio transponder includes global positioning coordinates.
25. The method of claim 23, wherein the radio signal transmitted by the radio transponder includes atmospheric data.
26. The method of claim 23, wherein the radio signal transmitted by the radio transponder includes cautionary information.
27. The method of claim 23, wherein the radio signal transmitted by the radio transponder includes traffic information.
28. The method of claim 23, wherein the radio signal transmitted by the radio transponder includes depth information.

* * * * *